(12) United States Patent
Szolusha

(10) Patent No.: US 9,351,352 B2
(45) Date of Patent: May 24, 2016

(54) BOOST THEN FLOATING BUCK MODE CONVERTER FOR LED DRIVER USING COMMON SWITCH CONTROL SIGNAL

(71) Applicant: Linear Technology Corporation, Milpitas, CA (US)

(72) Inventor: Keith D. Szolusha, Saratoga, CA (US)

(73) Assignee: Linear Technology Corporation, Milpitas, CA (US)

( * ) Notice: Subject to any disclaimer, the term of this patent is extended or adjusted under 35 U.S.C. 154(b) by 101 days.

(21) Appl. No.: 14/452,335

(22) Filed: Aug. 5, 2014

(65) Prior Publication Data

US 2015/0289325 A1    Oct. 8, 2015

Related U.S. Application Data

(60) Provisional application No. 61/974,787, filed on Apr. 3, 2014.

(51) Int. Cl.
H05B 33/08    (2006.01)

(52) U.S. Cl.
CPC ............ *H05B 33/08* (2013.01); *H05B 33/0815* (2013.01); *H05B 33/0818* (2013.01)

(58) Field of Classification Search
None
See application file for complete search history.

(56) References Cited

U.S. PATENT DOCUMENTS

| 6,348,781 | B1 | 2/2002 | Midya et al. | |
|---|---|---|---|---|
| 7,952,294 | B2* | 5/2011 | Shteynberg | H02M 3/155 315/224 |
| 8,339,063 | B2* | 12/2012 | Yan | H05B 37/02 315/209 R |
| 8,674,620 | B2* | 3/2014 | Capodivacca | H05B 33/0857 315/185 S |
| 9,178,421 | B2* | 11/2015 | Dally | H02M 3/158 |
| 2003/0090237 | A1* | 5/2003 | Shenai | H02J 7/0052 320/139 |
| 2005/0105311 | A1* | 5/2005 | Soldano | H02M 1/4225 363/89 |

(Continued)

FOREIGN PATENT DOCUMENTS

| CN | 103260318 A | 8/2013 |
|---|---|---|
| EP | 2424332 A1 | 2/2012 |

(Continued)

OTHER PUBLICATIONS

Sabyasachi Sengupta et al., "Module 3 DC to DC Converters", NPTEL, Aug. 25, 2008, pp. 1-15, XP055196525, NPTEL>>Electrical Engineering>>Power Electronics (Web)>>C uK and Sepic Converter, <http://www.nptel.ac.in/courses/1081050/66/PDF/L-24(DK&SSG)(PE)((EE)NPTEL).pdf>.

(Continued)

*Primary Examiner* — Crystal L Hammond
(74) *Attorney, Agent, or Firm* — Patent Law Group LLP; Brian D. Ogonowsky

(57) ABSTRACT

A converter has a boost portion and a buck portion. The boost portion supplies a boosted voltage and includes a first inductor having a first end coupled to the input terminal, a first switch coupled to a second end of the first inductor to charge the first inductor when the first switch is in its on-state, and a first capacitor for being charged to the boosted voltage. The buck portion supplies an output voltage to a load that is less than the boosted voltage and includes a second inductor in series with the load, and a second switch in series with the second inductor and the load to charge the second inductor during an on-state of the second switch. A single controller IC receives feedback signals and controls the switches to have the same duty cycle to achieve a regulated load current or voltage with low EMI.

24 Claims, 4 Drawing Sheets

(56) References Cited

U.S. PATENT DOCUMENTS

| | | | |
|---|---|---|---|
| 2008/0224625 A1* | 9/2008 | Greenfeld | H05B 33/0851 315/201 |
| 2010/0295472 A1* | 11/2010 | Wibben | H02M 3/158 315/294 |
| 2012/0256561 A1* | 10/2012 | Kwon | H05B 33/0815 315/307 |
| 2012/0299512 A1* | 11/2012 | Watanabe | H05B 33/0845 315/307 |
| 2012/0319604 A1* | 12/2012 | Walters | H02M 3/1582 315/200 R |
| 2013/0049626 A1* | 2/2013 | Zhang | H05B 33/0815 315/240 |
| 2014/0091724 A1* | 4/2014 | Palmer | H02M 3/1582 315/201 |
| 2015/0115825 A1* | 4/2015 | Lee | H05B 33/0896 315/210 |

FOREIGN PATENT DOCUMENTS

| | | |
|---|---|---|
| EP | 2536013 A2 | 12/2012 |
| EP | 2611018 A2 | 7/2013 |

OTHER PUBLICATIONS

PCT/US15/17330, EPO as ISA, International Search Report and Written Opinion, Jun. 24, 2015, 12 pages.

* cited by examiner

US 9,351,352 B2

BOOST THEN FLOATING BUCK MODE CONVERTER FOR LED DRIVER USING COMMON SWITCH CONTROL SIGNAL

CROSS REFERENCE TO RELATED APPLICATIONS

This application claims priority from U.S. provisional application Ser. No. 61/974,787, by Keith D. Szolusha, filed Apr. 3, 2014, incorporated by reference.

FIELD OF INVENTION

The present invention relates to current regulators for driving a series string of light emitting diodes (LEDs) and, in particular, to a regulator that receives an input voltage and outputs a voltage above or below the input voltage to drive the LEDs at a regulated target current.

BACKGROUND

In some applications, it is desirable to convert an input voltage to an output voltage that is above or below the input voltage. The output may be a regulated voltage or a regulated current. As an example, it may be desirable to drive a series string of light emitting diodes (LEDs) at a regulated target current, where the voltage across the string must be about 20 volts and where the power supply may provide anywhere from 3 volts to 40 volts. In one example of a suitable converter, the input voltage is applied to a boost regulator to output a regulated boosted voltage above what would be required for the load. The boost regulator is then followed by an independently controlled buck regulator that receives the boosted voltage as an input and outputs the required regulated current for the load. The user typically sets the target output current. Such a converter requires two controller ICs (a boost controller IC and a buck controller IC), which adds cost and requires extra space on a printed circuit board. Further, since the switches in the boost side and buck side switch independently, audible beat frequencies may result. Other disadvantages exist.

Buck-boost regulators are also known that use a single controller for controlling an H-bridge of four switches (e.g., MOSFETs), where an inductor is connected across the bridge. The four switches are controlled to either act in a buck mode or a boost mode, or both, depending on whether the input voltage is detected as being above or below the required output voltage. Such converters have a switch between the input terminal and the inductor and between the output terminal and the inductor. Therefore, such converters can have a high input ripple and a high output ripple. The high input ripple adversely affects other circuits connected to the power supply bus, while the high output ripple adversely affects certain types of loads. The high ripples also generate high electromagnetic interference (EMI) at the switching frequency and its harmonics.

Organic LEDs (OLEDs) require a regulated voltage rather than a regulated current. The above-described current regulators may easily be converted to voltage regulators by feeding back an output voltage signal rather than a load current signal.

In certain applications, a converter having low ripple at the input and output is important, as well as having low EMI. Thus, what is needed is a converter for driving LEDs that may convert an input voltage to a higher or lower voltage, where only one controller IC is needed, and where there is low input and output ripple.

SUMMARY

In one embodiment, a converter for driving LEDs has a boost stage, where a first inductor is between the power supply voltage input terminal and a boost-stage switch (e.g., a first MOSFET). The boost-stage switch is a low-side switch since is it connected between the inductor and ground. The location of the first inductor results in a desirable low input ripple. The output of the boost stage is a relatively constant boosted voltage above the input voltage. The boosted voltage is not regulated to match a target boosted voltage, since instead the load current is regulated. The boosted voltage is above that needed at the output of the converter for driving the load at the target regulated current.

At the output of the boost stage is a "floating" buck mode stage having a low-side switch (e.g., a second MOSFET) that is controlled by the same gate control signal used to control the boost-stage switch. In other words, the two switches are on at the same time and off at the same time so have the same duty cycle. The buck mode stage has a second inductor coupled to the load, so there is also low output ripple. The buck mode stage is considered to be floating since the load is not tied to ground.

In one embodiment, a single controller IC receives, as a first feedback signal, the instantaneous boost-stage switch current for controlling the peak current through the boost-stage switch. The controller IC also receives, as a second feedback signal, a signal corresponding to the load current and controls the duty cycle of both low-side switches, with a single control signal, to cause the load current to match a target current.

Accordingly, using the present invention, only one controller IC is used, and there is little ripple at the input and output, so there is low EMI, and sensitive circuits in the system are not adversely affected by the converter's operation.

In another embodiment, the first feedback signal is the instantaneous current through the buck mode-stage switch for controlling the peak current through that switch.

In one particular configuration, a first end of the second inductor in the buck mode stage is coupled directly to the buck mode-stage switch, where the other terminal of the buck mode-stage switch is tied to ground. The boost-stage switch also has one terminal tied to ground via a current sense resistor. The LED load is connected between the boost voltage terminal and a second end of the second inductor. Since both switches are coupled to ground and have the same duty cycle, such a configuration can be slightly modified to tie the first end of the second inductor to the boost-stage switch to obviate the need for the buck mode stage switch and rectifier. Therefore, the cost and size of the converter is further reduced. This configuration is particular useful for driving a series string of LEDs, since an LED load can be floating and does not have to be connected to ground.

By configuring the converter as a voltage regulator, the converter may be an OLED driver since OLEDs also do not need to be coupled to ground.

Other embodiments are described.

BRIEF DESCRIPTION OF THE DRAWINGS

Elements in the various figures that are the same or equivalent are labeled with the same numeral.

DETAILED DESCRIPTION

Figure 1:
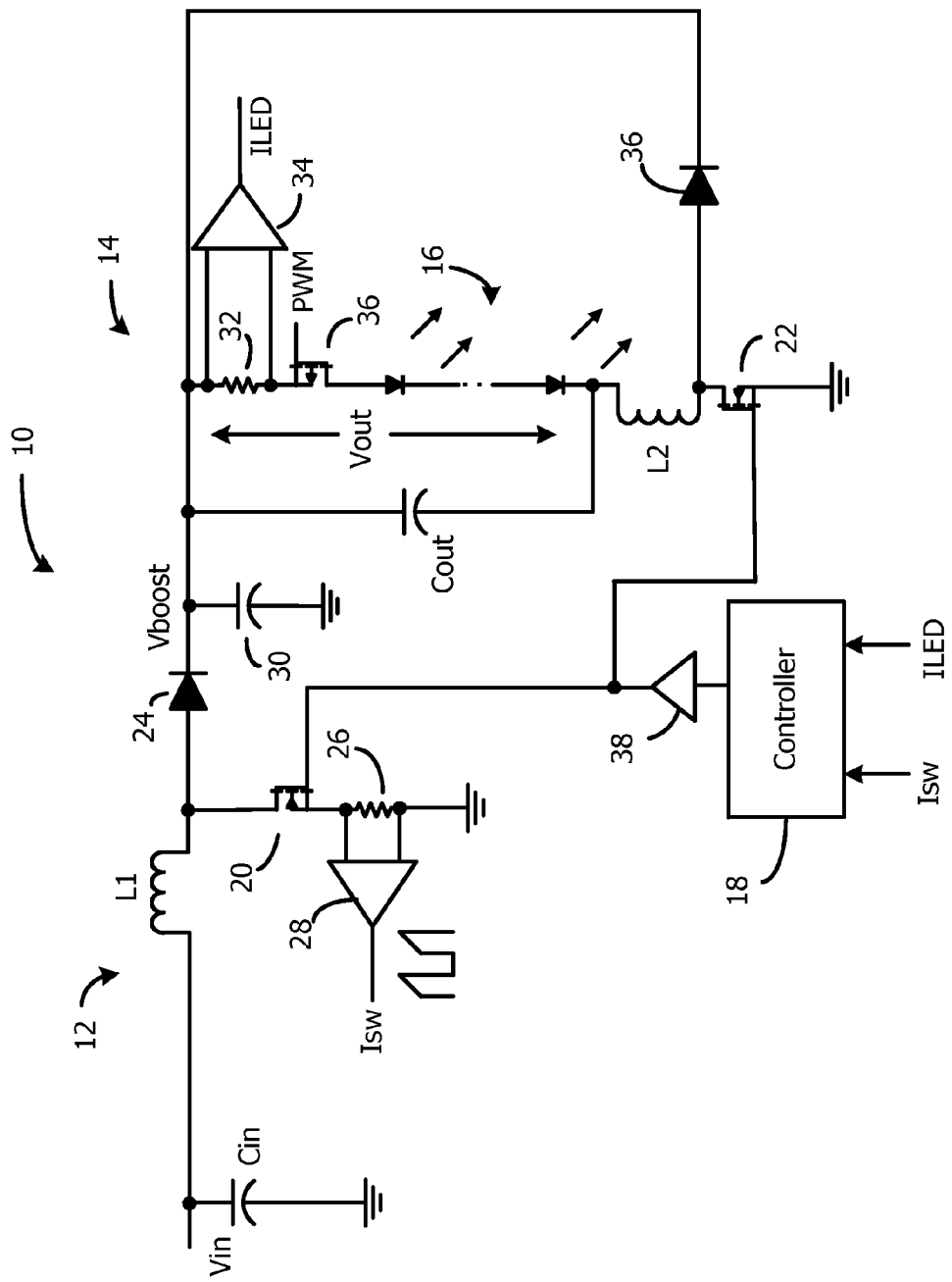
FIG. 1 illustrates a first embodiment of a boost-then-buck-mode converter for driving LEDs with a regulated current, in accordance with a first embodiment of the invention, using a single controller IC, for generating an output voltage that is higher than or lower than the input voltage, and where the peak current through the boost switch is regulated.

FIG. 1 illustrates a boost-then-buck-mode converter 10 having a boost portion 12 and a floating buck portion 14. The load 16 is a series string of light emitting diodes (LEDs) or other load that requires a regulated current rather than a regulated voltage. A controller 18 (typically formed as an integrated circuit) receives as feedback signals a ramping switch current (at the switching frequency) and a DC load current. Based on these feedback signals, the controller 18 controls the duty cycle of the transistor switches 20 and 22, using a single control signal, to maintain the load current at a target current, where the target current is typically set by the user. The switches 20 and 22 are shown as N-channel MOSFETs but may be other types of switches.

The converter 10 has an inductor L1 at its input, receiving an input voltage Vin from a power supply, and has another inductor L2 at its output coupled to the load 16. The inductor L1 filters switching transients (input ripples) so they are not coupled to the power supply bus, which would otherwise adversely affect other circuitry connected to the bus. The inductor L2 filters switching transients (output ripples) at the load 16, which is significant for certain types of loads. This also lowers EMI at the switching frequency and its harmonics. Since there is only one IC controller 18 controlling both the boost portion 12 and the buck portion 14, the size and cost of the converter 10 are reduced, compared with a boost-buck converter with two ICs or two separate gate signals.

In some prior art systems, the user connects one or more extra inductors between a converter and the power supply or the load to reduce the input or output ripple. Such extra inductors are not needed in the present invention.

Although the converter 10 is configured to supply a regulated current, it can easily be configured to supply a regulated voltage by feeding back a divided output voltage into the controller 18 rather than a signal corresponding to the load current.

During operation, an input capacitor Cin helps reduce input ripple on the power supply bus. The boost switch 20 and buck switch 22 are turned on at the beginning of each switching cycle, using an oscillator internal to the controller 18. When the boost switch 20 is turned on (closed), an upward ramping current flows through the inductor L1. The diode 24 (e.g., a Schottky diode) is reverse biased at this time. This ramping current also flows through a very low value sense resistor 26. The voltage drop across the resistor 26 is detected by a difference amplifier 28, and the output of the amplifier 28 generates a feedback signal Isw corresponding to the instantaneous current through the switch 20 and inductor L1. The signal Isw is applied to an input of the controller 18 for controlling the peak current through the boost switch 20. The inductor L1 charges during this time.

When the peak current crosses a threshold related to the load current, described later, the controller 18 turns off the boost switch 20 and the buck switch 22. The switches 20 and 22 thus switch at the same duty cycle D. The voltage at the right side of the inductor L1 changes to forward bias the diode 24. A downward ramping current through the inductor L1 then recharges the capacitor 30. The voltage across the capacitor 30 is maintained at a relatively constant boosted voltage Vboost by the regulating operation of the converter 10. Vboost may be any voltage greater than Vin. This boosted voltage Vboost is then applied as an input voltage to the buck portion 14 of the converter 10. The buck portion 14 is controlled to produce an output voltage lower than Vboost, where the output voltage is whatever voltage is needed across the load 16 to match the target current.

When the buck switch 22 is closed, an upward ramping current flows through the inductor L2. When the buck switch 22 is turned off, the voltage at the bottom of the inductor L2 changes to forward bias the diode 36. The current though the inductor L2 ramps down and is sent back to the boost output capacitor 30 and output capacitor Cout via the diode 36. During the time that the inductor L2 current is above the average load current, the capacitor Cout is being recharged by the inductor L2 current, and during the time that the inductor L2 current is below the average load current, the capacitor Cout discharges somewhat while maintaining a target current through the load 16. The triangular ripple current of the inductor is smoothed by the output capacitor, and the capacitor Cout supplies whatever voltage Vout is needed across the load 16 to match the detected output current ILED to a target current, typically set by the user.

Figure 2:
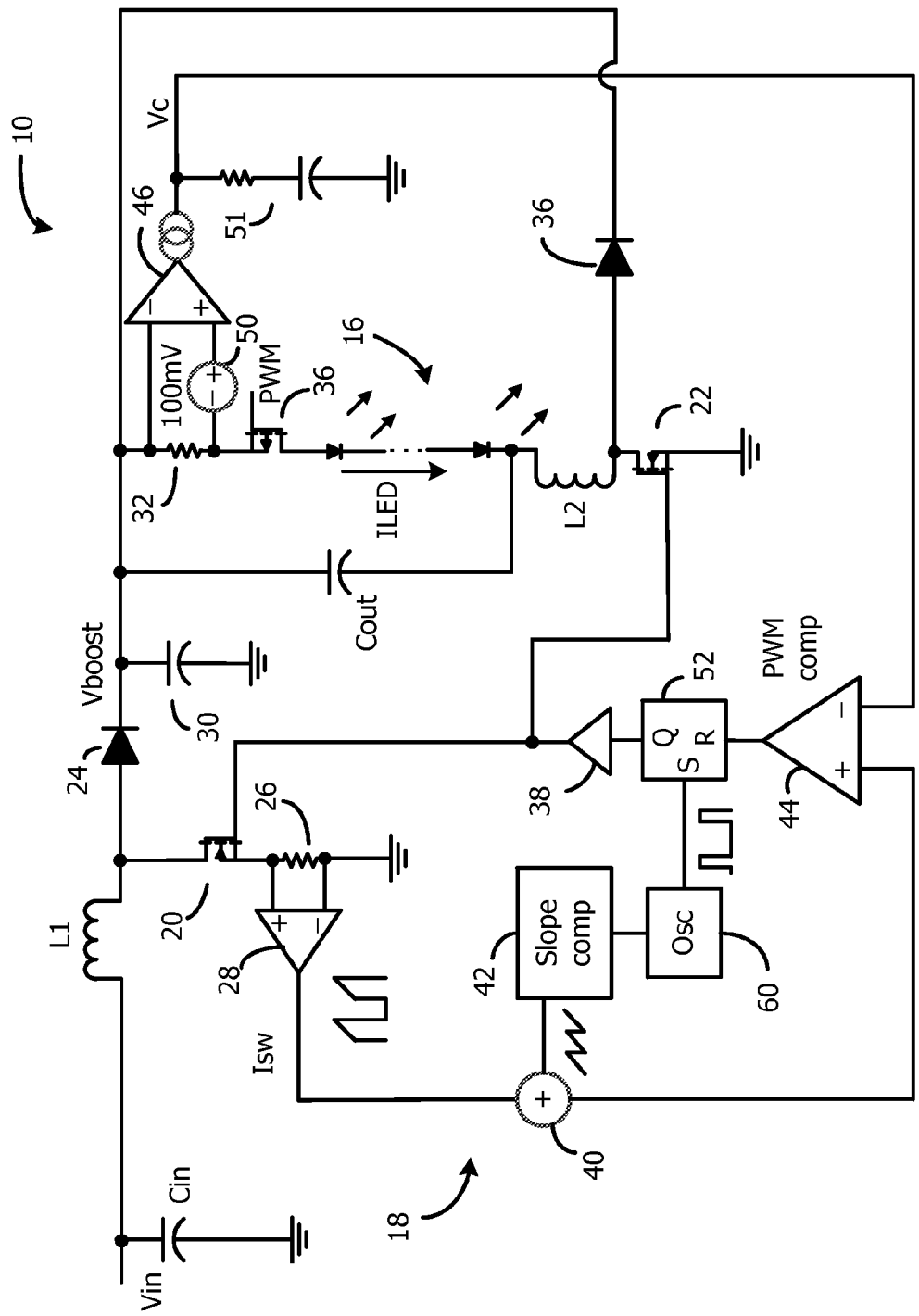
FIG. 2 illustrates in more detail one possible controller IC for the converter of FIG. 1.

The LED current flows through a low value sense resistor 32, and the voltage drop is detected by a difference amplifier 34. The difference amplifier 34 in the various figures represents a more complex current detection circuit, and FIG. 2 illustrates the detection circuit as a transconductance error amplifier, an offset voltage, and a resistor/capacitor network for generating a control voltage Vc corresponding to the peak current of the boost switch 20 needed to maintain the load current at a target current. In an actual embodiment, some or all of the detection circuit is contained in the controller 18 block. In the simplified FIG. 1, the output signal ILED of the amplifier 34 corresponds to the LED current, and ILED is applied as a feedback signal to the controller 18. The controller 18 matches ILED to a target current value by adjusting the duty cycle of the switches 20 and 22. Other types of controllers may be used.

The switches 20 and 22 are shown sharing a common driver 38. The driver 38 may be a conventional push-pull driver with its rail voltages being ground and a voltage that is at or above a MOSFET turn-on threshold voltage above ground.

The cycle repeats to maintain a constant current through the load 16. The combination of an inductor and capacitor at the input and output results in very low input and output ripple, and consequently low EMI.

For a voltage regulator, the sense resistor 32 and amplifier 34 would be deleted and a voltage sensor would be connected across the load to generate a voltage feedback signal for matching to a target voltage by the controller 18.

The inductors L1 and L2 may be separate or cross-coupled.

The duty cycle (percentage on-time per cycle) of the switches 20 and 22 is D, and the duty cycle is regulated by the converter 10 to output a voltage Vout across the load 16 that is required to achieve the target current through the load 16. The duty cycle is approximately D=Vout/(Vin+Vout). In one example, Vout=Vin, so the duty cycle is about 50%. In another example, Vout=3*Vin, so the duty cycle is about 75%. In another example, Vout=Vin/2, so the duty cycle is about 33%.

The sense resistor 26 may instead be connected before or after the inductor L1 since that is the same current path as the switch 20 current. In another embodiment, the internal resistance of the inductor L1 or switch 20 acts as the sense resistor 26. Similarly, the sense resistor 32 may be located anywhere in the current path of the load 16, such as between the load 16 and the inductor L2, in series with the inductor L2, or between the switch 22 and ground.

A PWM MOSFET 36 may be connected in series with the LED load 16 for controlling the apparent brightness of the LEDs. The PWM signal, such as at 60 Hz or above to avoid perceptible flicker, may be generated by the controller 18 and set by an external control signal. The switching frequency of the switches 20 and 22 will typically be between 100 kHz and 5 MHz, so there will be many switching cycles per PWM dimming cycle. The load current measurement is only taken when the PWM MOSFET 36 is on. The capacitor COUT maintains the LED string voltage during the PWM MOSFET 36 off-time when the LED string is disconnected. This allows the LED string to quickly return to its regulated current when the PWM MOSFET 36 is turned back on at the beginning of the next PWM cycle.

The LED load may instead be a single LED, an array of LEDs, LEDs in series and parallel, or any other configuration of LEDs.

FIG. 2 illustrates more detail of one possible controller 18 that may be formed as a single IC chip. The inductors L1 and L2 and the various capacitors are typically external to the chip due to their size; however, small value inductors and capacitors may be formed on the chip.

When the switch 20 is on, the upward ramping output of the amplifier 28 is applied to an input of a summer 40. A synchronized upward ramping sawtooth waveform from a slope compensator 42 is applied to the other input of the summer 40 for slope compensation at the larger duty cycles. Slope compensation is conventional.

The output of the summer 40 is an upward ramping signal applied to an input of a pulse width modulation (PWM) comparator 44.

During this time, a regulated LED current ILED flows through the LED load 16. The voltage drop across the sense resistor 32 corresponds to the load 16 current. The high-side terminal of the resistor 32 is coupled to one input terminal of a transconductance error amplifier 46, and the low-side terminal of the resistor 32 is coupled to an offset voltage 50, whose value sets the target regulated current. The offset voltage level is set so that the inputs into the error amplifier 46 are equal at the target current. The user may set the offset voltage level with an external component, such as a resistor, or it may be fixed inside the IC. In the example, the offset voltage is set to 100 mV, which may correspond to a target load current of, for example, 1 A.

The output of the error amplifier 46 is connected to an RC circuit 51 to generate a control voltage Vc that sets the peak current though the inductor L1 and switch 20. The control voltage Vc is coupled to the other input of the PWM comparator 44. Vc is stable under steady state conditions.

When the ramping signal from the summer 40 crosses the Vc level, the output of the PWM comparator 44 resets an RS flip flop 52. The resulting low output of the flip flop 52 controls the driver 38 to turn off the switches 20 and 22.

When the switches 20 and 22 are off, the current through the inductors L1 and L2 ramp down. At the start of the next switching cycle, controlled by an oscillator 60, the flip flop 52 is set to turn on the switches 20 and 22, and the feedback process repeats. A typical switching frequency is between 100 kHz and 5 MHz.

The sense resistors 26 and 32 may be located at other points along their same current path.

In all embodiments, the diodes 24 and 36 may be replaced with synchronous rectifier MOSFETs and controlled with duty cycle 1-D to emulate the function of the diodes 24 and 36 but with lower voltage drops to increase efficiency. Diodes and synchronous rectifiers are both referred to herein as rectifiers.

The same controller 18 may be used in the other embodiments.

In an alternative embodiment, the peak current through the inductor L2 and switch 22 may be regulated by sensing the current through a sense resistor in series with the switch 22. The peak current will be that needed to obtain the target current through the load 16. The switches 20 and 22 will still switch in the same manner as previously described, where the duty cycle of the switches 20 and 22 will be that needed to achieve the target output current, and Vboost will be the same as with the embodiments of FIGS. 1 and 2.

Figure 3:
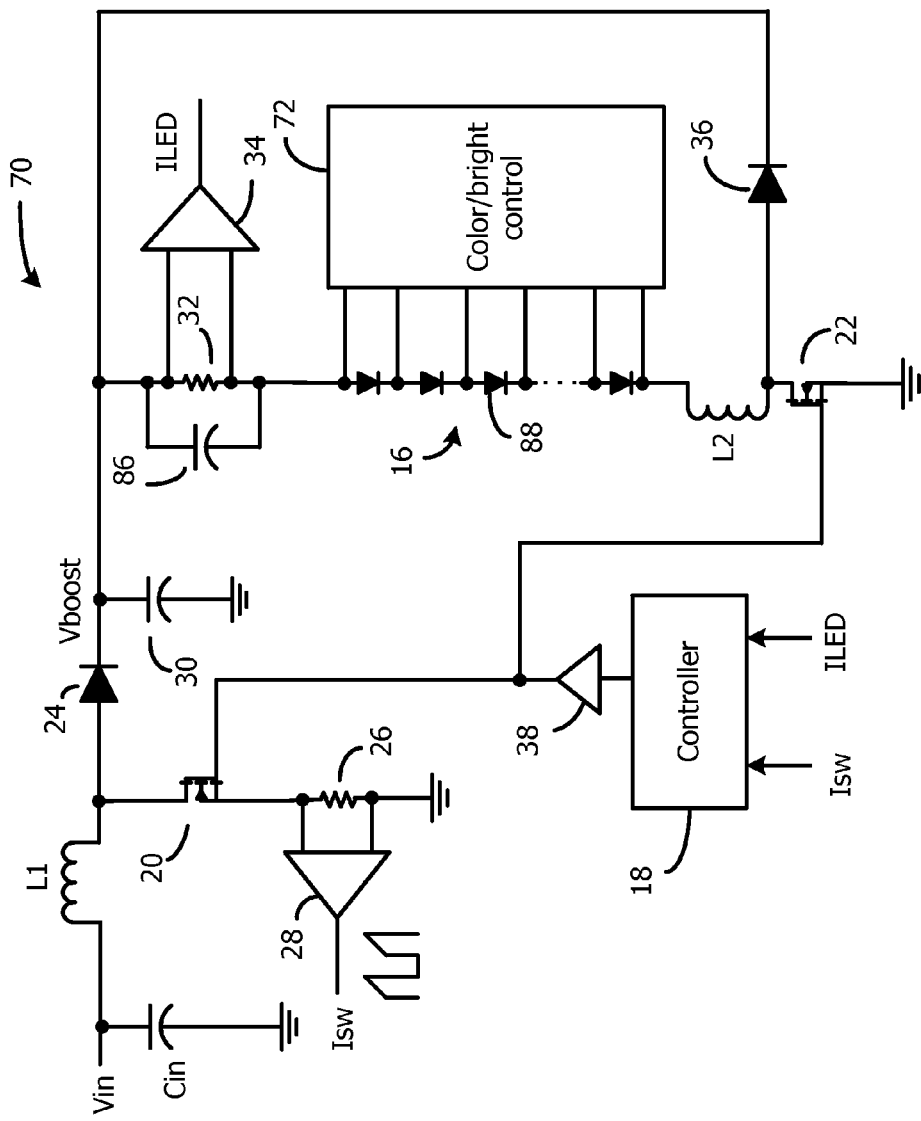
FIG. 3 illustrates a second embodiment of a boost-then-buck-mode converter where an independent control circuit selectively controls which LEDs in a series string are illuminated for brightness and/or color control.

FIG. 3 illustrates a second embodiment of a boost-then-buck-mode converter 70 with a control circuit 72 for selectively controlling which LEDs in a series string are illuminated for brightness or color control, where the LEDs in the string may have different phosphors for emitting different colors. The constant current ILED through the LED load 16 is sensed by a sense resistor 32 in series with the load 16 using the difference amplifier 34. The difference amplifier 34 may represent the more complex load current detection circuitry shown in FIG. 2 as part of the controller 18. The controller 18 receives Isw and ILED and controls the duty cycle of the switches 20 and 22 to achieve the target current through the load 16.

Since the high frequency ripple current (the triangular inductor L2 current) through the LEDs will not result in perceptible flicker, an output capacitor (e.g., Cout in FIG. 2) is not required, saving considerable cost and space and allowing fast transient response of LED current as LEDs are switched into and out of the string by the dimmer (color/brightness control circuit 72). A capacitor 86 is connected across the sense resistor 32 for maintaining a relatively constant voltage drop across the sense resistor 32 so the average LED current is detected by the amplifier 34. The size of the capacitor 86 is much smaller than the size of the output capacitor Cout in FIG. 2 due to the low voltage across the sense resistor 32.

The LEDs 88 in the string may be the same type of LED, such as blue emitting GaN LEDs, but with different phosphor coatings so that there are some LEDs that emit blue light, some LEDs that emit green light, and some LEDs that emit red light. The controller 72 is controlled by an external digital signal to selectively provide a short across individual LEDs to turn them off. The LEDs that are not shorted will continue to have the same brightness since the converter 70 will compensate for the reduced voltage drop and adjust the duty cycle to maintain the target current through the LEDs. In that way, the emitted color can be controlled. Also, by selectively shorting the LEDs, the brightness can be controlled in addition to the color, so a PWM dimming MOSFET is not needed.

Figure 4:
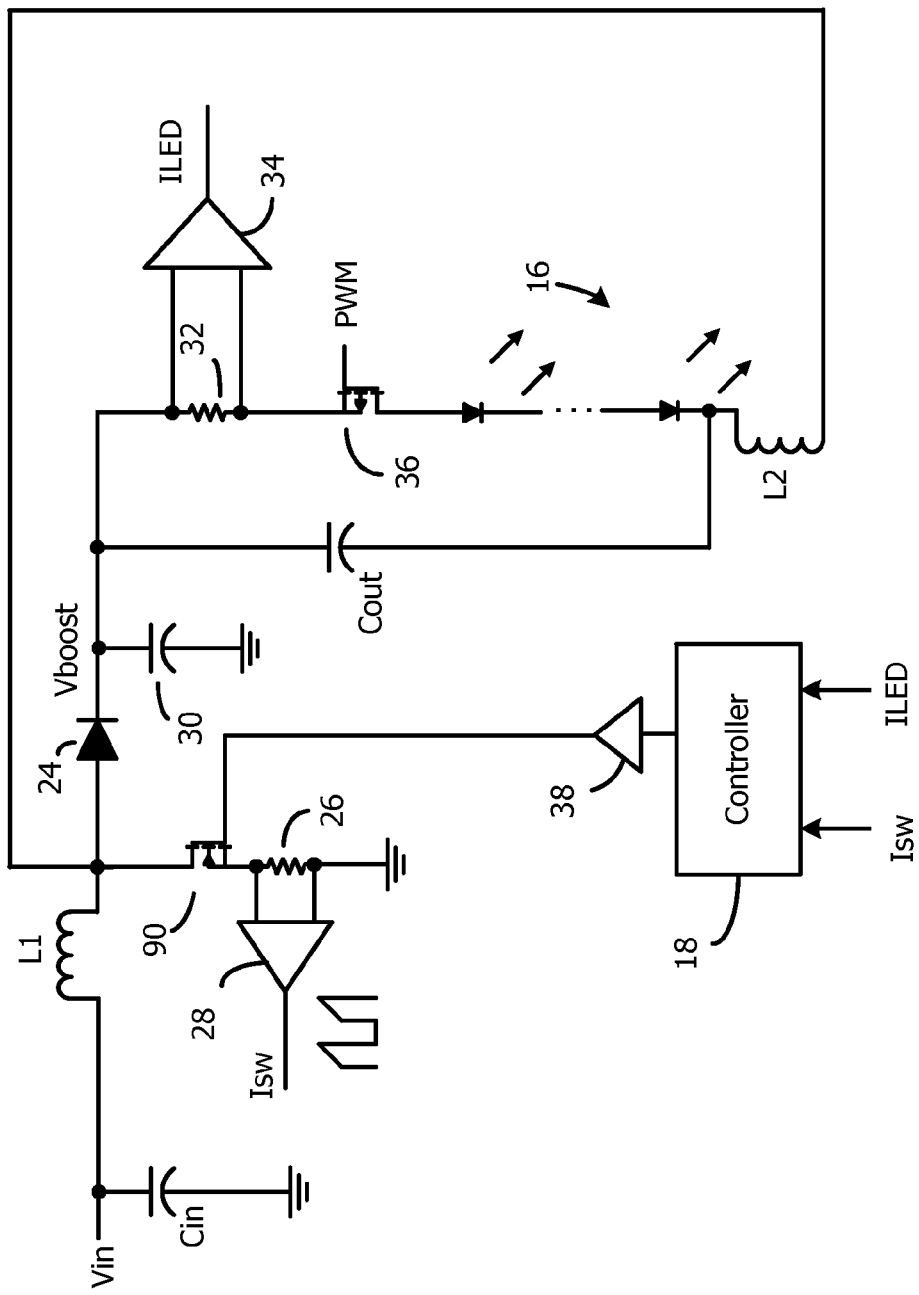
FIG. 4 illustrates a third embodiment of a boost-then-buck-mode converter where only one common low-side switch and one common high-side rectifier is used for both the boost stage and the buck mode stage.

Since the switches 20 and 22 in FIGS. 1-3 are both coupled to ground (ignoring the low value sense resistor 26) and have the same duty cycle, the switches 20 and 22 can be effectively merged into a single switch 90, as shown in FIG. 4. The switch 90 may be multiple switches connected in parallel for increased power handling. The peak current through the switch 90 is regulated by the controller 18 (to control its duty cycle) to cause the load current ILED to match a target current, as previously described. Thus, cost and size are further reduced. The input and output ripple are very low due to the inductors L1 and L2 at the input and output. The same load current detection circuit and switch control circuit shown in FIG. 2 may be used in all the embodiments. The rectifiers (diodes or synchronous switches) are also combined in FIG. 4 since their duty cycle (1-D) and voltages are the same. The two-switch, two-rectifier converter becomes a one-switch, one rectifier converter with the same properties.

In FIG. 4, the sensed switch current Isw is the IL1+IL2 peak current instead of just the IL1 peak current. This setup has more switch current information and slope and will be compensated by the sense resistor and control loop. The sense resistor 26 can be placed in series with either the inductor L1 or L2 in order to use either the boost or buck stage peak current information to control the duty cycle.

The output capacitor Cout of FIG. 4 can be the standard output capacitor Cout in FIGS. 1 and 2, or there can be no output capacitor, and a filter capacitor across the resistor 32 and a color/brightness control circuit 72 can be used, as shown in FIG. 3.

Loads other than LEDs may be driven, and the converters may easily be configured to generate a regulated voltage, such as for driving OLEDs, by feeding back the output voltage, as previously described.

All components of the converter may be formed in a single integrated circuit. Any features described may be combined in different ways in a single converter.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A converter coupled to drive a light emitting diode (LED) load comprising:
    an input terminal for receiving an input voltage;
    a boost portion of the converter, the boost portion being controlled to supply a boosted voltage higher than the input voltage, the boost portion comprising:
        a first inductor having a first end coupled to the input terminal;
        a first switch coupled to a second end of the first inductor for pulling the second end to a low voltage when the first switch is in an on-state to charge the first inductor;
        a first rectifier, coupled between the first switch and a first capacitor, to conduct a current through the first inductor when the first inductor is discharging while the first switch is in an off-state, the first capacitor being coupled to smooth a current and for being charged to the boosted voltage;
    a buck mode portion of the converter, the buck portion being controlled to supply an output voltage to an LED load that is less than the boosted voltage, the buck mode portion comprising:
        a second inductor, wherein the LED load is coupled between a first end of the second inductor and the first capacitor;
        a second switch coupled to a second end of the second inductor to charge the second inductor when the first switch and the second switch are in an on-state;
        a second rectifier, coupled between the second end of the second inductor and the first capacitor, to conduct a current through the second inductor when the second inductor is discharging while the first switch and the second switch are in an off-state;
    a controller receiving a first feedback signal corresponding to a current through the first switch or the second switch in their on-states, and the controller receiving a second feedback signal corresponding to an LED load current or LED load voltage,
    wherein the controller controls the first switch and the second switch to have the same duty cycle and regulates a peak current through the first switch or the second switch to regulate the LED load current or load voltage,
    wherein the controller comprises:
        an error amplifier receiving a signal corresponding to a load current or a load voltage, the error amplifier generating a control voltage corresponding to a switching duty cycle needed to achieve a target load current or load voltage;
        a pulse width modulation (PWM) comparator comparing the control voltage to a signal corresponding to an instantaneous current through the first switch or the second switch;
        a switch control circuit coupled to receive an output of the PWM comparator for switching the states of the first switch and the second switch when a ramping current through the first switch or the second switch crosses the control voltage; and
        an oscillator for resetting the first switch and the second switch at a beginning of a switching cycle.

2. The converter of claim 1 wherein the first switch is a first MOSFET and wherein the second switch is a second MOSFET.

3. The converter of claim 1 wherein the first rectifier is a first diode and wherein the second rectifier is a second diode.

4. The converter of claim 1 wherein the first feedback signal is an instantaneous current through the first switch when the first switch is in its on-state, and wherein the controller regulates a peak current through the first switch.

5. The converter of claim 4 further comprising a sense resistance in a current path including the first inductor and the first switch.

6. The converter of claim 1 wherein the first feedback signal is an instantaneous current through the second switch when the second switch is in its on-state, and wherein the controller regulates a peak current through the second switch.

7. The converter of claim 6 further comprising a sense resistance in a current path including the second inductor and the second switch.

8. The converter of claim 1 wherein the second inductor and the second switch are coupled between a first terminal of the load and ground, and wherein a second terminal of the load is coupled to receive a voltage at a terminal of an output capacitor, wherein the output capacitor is charged by a current through the second inductor.

9. The converter of claim 1 wherein the second inductor and the second switch are coupled between a first terminal of the load and ground, and wherein a second terminal of the load is coupled to receive a voltage at a terminal of the first capacitor.

10. The converter of claim 1 further comprising a sense resistance in series with the load for detecting a current through the load, the second feedback signal corresponding to a load current so that the controller regulates the load current to match a target current.

11. The converter of claim 1 wherein the second feedback signal corresponds to a load voltage so that the controller regulates a floating load voltage to match a target voltage.

12. The converter of claim 1 wherein the second feedback signal corresponds to an LED load current, wherein a voltage drop across a sense resistor in series with the LED load is sensed to generated the second feedback signal, the converter further comprising a capacitor connected across the sense resistor for filtering a ramping current through the LED load.

13. The converter of claim 1 wherein the controller is formed as an integrated circuit.

14. The converter of claim 1 wherein the load comprises a series string of light emitting diodes (LEDs), and wherein the converter regulates a current through the LEDs.

15. The converter of claim 1 further comprising a third switch coupled to the LED load, the third switch being controlled separately from the first switch and the second switch for controlling a perceived brightness of the LED load.

16. The converter of claim 15 further comprising an output capacitor in parallel with the LED load to maintain an output voltage across the LED load when the third switch is off.

17. The converter of claim 1 wherein the LEDs are OLEDs, and the converter regulates a voltage across the OLEDs.

18. A converter coupled to drive a light emitting diode (LED) load comprising:
an input terminal for receiving an input voltage;
a boost portion of the converter, the boost portion being controlled to supply a boosted voltage higher than the input voltage, the boost portion comprising:
a first inductor having a first end coupled to the input terminal;
a first switch coupled to a second end of the first inductor for pulling the second end to a low voltage when the first switch is in an on-state to charge the first inductor;
a first rectifier, coupled between the first switch and a first capacitor, to conduct a current through the first inductor when the first inductor is discharging while the first switch is in an off-state, the first capacitor being coupled to smooth a current and for being charged to the boosted voltage;
a buck mode portion of the converter, the buck portion being controlled to supply an output voltage to an LED load that is less than the boosted voltage, the buck mode portion comprising:
a second inductor, wherein the LED load is coupled between a first end of the second inductor and the first capacitor;
a second switch coupled to a second end of the second inductor to charge the second inductor when the first switch and the second switch are in an on-state;
a second rectifier, coupled between the second end of the second inductor and the first capacitor, to conduct a current through the second inductor when the second inductor is discharging while the first switch and the second switch are in an off-state;
a controller receiving a first feedback signal corresponding to a current through the first switch or the second switch in their on-states, and the controller receiving a second feedback signal corresponding to an LED load current or LED load voltage,
wherein the controller controls the first switch and the second switch to have the same duty cycle and regulates a peak current through the first switch or the second switch to regulate the LED load current or load voltage,
wherein the LED load comprises a series string of LEDs, the converter further comprising:
a shorting circuit connected to the LEDs for selectively shorting the LEDs to at least control a perceived brightness or a perceived emitted color of the LEDs;
a sense resistor connected in series with the LEDs for detecting a current through the LEDs and creating the second feedback signal; and
a filter capacitor coupled across the sense resistor.

19. A converter coupled to drive a light emitting diode (LED) load comprising:
an input terminal for receiving an input voltage;
a boost portion of the converter, the boost portion being controlled to supply a boosted voltage higher than the input voltage, the boost portion comprising:
a first inductor having a first end coupled to the input terminal;
a first switch coupled to a second end of the first inductor for pulling the second end to a low voltage when the first switch is in an on-state to charge the first inductor;
a first rectifier, coupled between the first switch and a first capacitor, to conduct a current through the first inductor when the first inductor is discharging while the first switch is in an off-state, the first capacitor being coupled to smooth a current and for being charged to the boosted voltage;
a buck mode portion of the converter, the buck portion being controlled to supply an output voltage to an LED load that is less than the boosted voltage, the buck mode portion comprising:
a second inductor, wherein the LED load is coupled between a first end of the second inductor and the first capacitor, the second inductor having a second terminal coupled to the first switch; and
a controller receiving a first feedback signal corresponding to a current through the first switch in its on-state, and the controller receiving a second feedback signal corresponding to an LED load voltage or LED load current,
wherein the controller controls a duty cycle of the first switch by regulating a peak current through the first switch to regulate the LED load voltage or LED load current,
wherein the controller comprises:
an error amplifier receiving a signal corresponding to a load current or a load voltage, the error amplifier generating a control voltage corresponding to a switching duty cycle needed to achieve a target load current or load voltage;
a pulse width modulation (PWM) comparator comparing the control voltage to a signal corresponding to an instantaneous current through the first switch or the second switch;
a switch control circuit coupled to receive an output of the PWM comparator for switching the states of the first switch and the second switch when a ramping current through the first switch or the second switch crosses the control voltage; and
an oscillator for resetting the first switch and the second switch at a beginning of a switching cycle.

20. The converter of claim 19 further comprising an output capacitor connected in parallel with the LED load.

21. The converter of claim 19 wherein the second feedback signal corresponds to the load current for regulating the current through the LED load.

22. The converter of claim 19 wherein the controller is formed as an integrated circuit.

23. The converter of claim 19 wherein the LED load is an OLED load, and the converter regulates a voltage across the OLED load.

24. A converter coupled to drive a light emitting diode (LED) load comprising:
- an input terminal for receiving an input voltage;
- a boost portion of the converter, the boost portion being controlled to supply a boosted voltage higher than the input voltage, the boost portion comprising:
  - a first inductor having a first end coupled to the input terminal;
  - a first switch coupled to a second end of the first inductor for pulling the second end to a low voltage when the first switch is in an on-state to charge the first inductor;
  - a first rectifier, coupled between the first switch and a first capacitor, to conduct a current through the first inductor when the first inductor is discharging while the first switch is in an off-state, the first capacitor being coupled to smooth a current and for being charged to the boosted voltage;
- a buck mode portion of the converter, the buck portion being controlled to supply an output voltage to an LED load that is less than the boosted voltage, the buck mode portion comprising:
  - a second inductor, wherein the LED load is coupled between a first end of the second inductor and the first capacitor, the second inductor having a second terminal coupled to the first switch;
- a controller receiving a first feedback signal corresponding to a current through the first switch in its on-state, and the controller receiving a second feedback signal corresponding to an LED load voltage or LED load current,
- wherein the controller controls a duty cycle of the first switch by regulating a peak current through the first switch to regulate the LED load voltage or LED load current,
- wherein the LED load comprises a series string of LEDs, the converter further comprising:
- a shorting circuit connected to the LEDs for selectively shorting the LEDs to at least control a perceived brightness or a perceived emitted color of the LEDs;
- a sense resistor connected in series with the LEDs for detecting a current through the LEDs and creating the second feedback signal; and
- a filter capacitor coupled across the sense resistor.

\* \* \* \* \*